United States Patent
Haremza et al.

(10) Patent No.: US 6,214,929 B1
(45) Date of Patent: *Apr. 10, 2001

(54) STABILIZED POLYMER DISPERSIONS OR POLYMER SOLUTIONS, AND PREPARED POLYMERS OBTAINABLE THEREFROM

(75) Inventors: Sylke Haremza, Neckergemünd; Jürgen Krockenberger, Stuttgart; Manfred Appel, Landau; Hubert Trauth, Dudenhofen; Joachim Pakusch, Speyer; Heinrich Sack, Hassloch, all of (DE)

(73) Assignee: BASF Aktiengesellscaft, Ludwigshafen (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/265,704

(22) Filed: Mar. 10, 1999

(30) Foreign Application Priority Data

Mar. 10, 1998 (DE) ................................. 198 10 268

(51) Int. Cl.$^7$ ................................ C08K 5/00; C08J 5/18; C09D 5/00; C09J 9/00
(52) U.S. Cl. ............................ 524/849; 524/81; 524/700; 524/804
(58) Field of Search ..................................... 524/700, 849, 524/81; 260/804

(56) References Cited

U.S. PATENT DOCUMENTS

| 3,627,744 | * | 12/1971 | Hopkins et al. | ................... 260/87.5 |
| 3,935,149 | * | 1/1976 | Kraft et al. | ................... 260/29.6 TA |
| 3,959,207 | | 5/1976 | Cox . | |
| 3,991,135 | * | 11/1976 | Kraft et al. | ....................... 260/876 R |
| 4,780,492 | | 10/1988 | Avar . | |
| 5,030,670 | | 7/1991 | Hess et al. . | |
| 5,288,777 | | 2/1994 | Gilg et al. . | |
| 5,476,882 | | 12/1995 | Berner et al. . | |

FOREIGN PATENT DOCUMENTS

| 2127919 | 3/1995 | (CA) . |
| 1 942 542 | 3/1971 | (DE) . |
| 34 08 949 | 9/1984 | (DE) . |
| 35 11 924 | 10/1985 | (DE) . |
| 0 669 124 | 8/1995 | (DE) . |
| 0 226 538 | 6/1987 | (EP) . |
| 0 479 725 | 4/1992 | (EP) . |
| 0 644 205 | 3/1995 | (EP) . |
| 1 310 985 | 3/1973 | (GB) . |
| 1310985 | * 3/1973 | (GB) ............................. C08F/45/60 |

OTHER PUBLICATIONS

Patent Abstracts of Japan, vol. 008, No. 45 (C–232), Jul. 6, 1984, JP 59 053545, Mar. 28, 1984.

* cited by examiner

*Primary Examiner*—David W. Wu
*Assistant Examiner*—K Egwin
(74) *Attorney, Agent, or Firm*—Oblon, Spivak, McClelland, Maier & Neustadt, P.C.

(57) ABSTRACT

A polymer is obtained by removing the medium from a polymer dispersion or polymer solution containing at least one polymeric phase and at least one stabilizer suitable to protect against the damaging effect of light, heat and/or oxidation.

17 Claims, No Drawings

STABILIZED POLYMER DISPERSIONS OR POLYMER SOLUTIONS, AND PREPARED POLYMERS OBTAINABLE THEREFROM

The invention relates to polymer dispersions or polymer solutions comprising at least one polymeric phase which comprise one or more stabilizers suitable for protecting organic material against the damaging effect of light, heat and/or oxidation.

The invention also relates to the preparation of such polymer dispersions or polymer solutions, and also prepared polymers which are obtainable by removing the dispersion medium or solvent from the polymer dispersions or polymer solutions of the invention. The invention embraces, furthermore, the use of polymer dispersions or polymer solutions or prepared polymers of the invention for protecting organic material, pharmaceutical or cosmetic products, polymer dispersions, paints or varnishes, and plastics against the damaging effect of light, heat and/or oxidation. In addition, the invention relates to the use of polymer dispersions or prepared polymers of the invention as light stabilizers in cosmetic preparations, in or as adhesives, in or as laminants, in or as adhesion promoters or in or as coating compositions which protect substrates against the damaging effect of light, heat and/or oxidation. The invention relates, moreover, to polymer films obtainable by filming polymer dispersions or prepared polymers of the invention and to articles which have been coated using polymer dispersions, polymer solutions, prepared polymers or polymer films of the invention.

A very wide variety of stabilizers are employed to stabilize organic material, such as plastics or coatings, for example, against the damaging effect of light, heat and/or oxidation. Since these substances are usually added in small amounts and/or have a consistency which makes them poorly suited to metering, they are normally added as a mixture with a carrier. Mixing the stabilizers with such a carrier has two main consequences; the establishment of an appropriate mixing ratio between carrier and stabilizers generally produces a satisfactory consistency, and the amount of (carrier-mixed) stabilizers to be used for subsequent metering is increased, which facilitates meterability. In the majority of cases, the concentration of stabilizers in such mixtures is set higher than is necessary for the subsequent use.

In the processing of plastics, the carrier normally consists of the same plastic that is to be stabilized by adding an appropriately formulated stabilizer/carrier mixture. Such a mixture of stabilizers and the relevant plastic is termed a masterbatch.

The document EP-A 0 805 178 describes pulverulent stabilizers which are obtained by supporting α tocopherol, alone or in a mixture with further additives, on polyolefins. This is done either by mixing the α tocopherol (and further additives, if used) with commercially available, porous polyolefin powder or by coextruding the α tocopherol (and further additives, if used) with the polyolefin at temperatures of 260° C., for example, cooling the coextrudate and comminuting it by cryogenic milling to give a powder.

The document EP-A 0 573 113 describes solid blends of stabilizers which comprise an organic polymer and at least one silicon compound having a sterically hindered amino group. These blends are prepared either by melting the components at temperatures from 170 to 280° C. or by coextrusion followed by pelletization. A third preparation option is to dissolve the components in solvents such as toluene, heptane or chloroform, for example, and then to remove the solvents under reduced pressure (0.1 torr) and at temperatures of 100–120° C. This option, however, will generally be avoided owing to the toxicological and environmental precautions and fire protection measures that have to be taken.

Disadvantages of the supported or carrier-mixed stabilizers known from the prior art are their preparation, which is often mechanically complex, and the usually accompanying thermal stress, which means that only certain stabilizers (and carriers/supports) can be used. In addition, the supported or carrier-mixed stabilizers described have been designed entirely for incorporation into plastics. Stabilizing polymer dispersions with such stabilizer systems, even when the latter are pulverulent, is not generally possible.

It is an object of the present invention to provide stabilizer systems, which can be employed both in polymer dispersions and—directly or following simple technical preparation steps—in plastics compositions. The stabilizer systems should also be able to be prepared simply and in a way which is not detrimental to the components.

We have found that this object is achieved by polymer dispersions or polymer solutions comprising at least one polymeric phase which comprise one or more stabilizers suitable for protecting organic material against the damaging effect of light, heat and/or oxidation.

To achieve the object we have also found prepared polymers which comprise one or more stabilizers suitable for protecting organic material against the damaging effect of light, heat and/or oxidation and which are obtainable by removing the dispersion medium from polymer dispersions or polymer solutions of the invention.

The dispersion medium can be removed using any technical steps which are common knowledge. Examples of suitable such steps include filtration, by which is meant, generally, the separation of the dispersed phase from the dispersion medium by means of a layer which is impermeable for the former but permeable to the latter. Such a layer may therefore consist, for example, of an appropriate textile filter or paper filter, or else of an appropriate metallic, glass or ceramic frit. A further option for removing the dispersion medium is centrifugation.

Alternatively, the dispersion medium or solvent can be removed by making use, for example, of freeze drying. Another possibility is to evaporate the dispersion medium or solvent. This can be realized advantageously by spray drying. In view of safety considerations, spray drying is particularly suitable if, in a preferred embodiment, the dispersion medium or solvent present in the polymer dispersions or polymer solutions of the invention is essentially water.

The polymer dispersions or polymer solutions of the invention and the prepared polymers of the invention that are obtainable from them preferably comprise one or more stabilizers selected from the following groups:
a) alkylated monophenols,
b) alkylthiomethylphenols,
c) hydroquinones and alkylated hydroquinones,
d) tocopherols,
e) hydroxylated diphenyl thioethers,
f) alkylidenebisphenols,
g) O-, N- and S-benzyl compounds,
h) aromatic hydroxybenzyl compounds,
i) triazine compounds,
j) benzylphosphonates,
k) acylaminophenols,
l) esters of β-(3,5-di-tert-butyl-4-hydroxyphenyl)propionic acid, β-(5-tert-butyl-4-hydroxy-3-methylphenyl) propionic acid, β-(3,5-dicyclohexyl-4-hydroxyphenyl)

propionic acid and 3,5-di-tert-butyl-4-hydroxyphenylacetic acid,
m) amides of β-(3,5-di-tert-butyl-4-hydroxyphenyl) propionic acid,
n) ascorbic acid and its derivatives,
o) antioxidants based on amine compounds,
p) phosphites and phosphonites,
q) 2-(2'-hydroxyphenyl)benzotriazoles,
r) sulfur-containing peroxide scavengers and sulfur-containing antioxidants
s) 2-hydroxybenzophenones,
t) esters of unsubstituted and substituted benzoic acid,
u) acrylates,
v) sterically hindered amines,
w) oxamides and
x) 2-(2-hydroxyphenyl)-1,3,5-triazines.

Group a) of the alkylated monophenols includes, for example, 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which possess a linear or branched side chain, such as 2,6-dinonyl-4-methylphenol, 2,4-dimethyl-6-(1'-methylundec-1'-yl) phenol, 2,4-dimethyl-6-(1'-methylheptadec-1'-yl)phenol, 2,4-dimethyl-6-(1'-methyltridec-1'-yl)phenol and mixtures of these compounds.

Group b) of the alkylthiomethylphenols includes, for example, 2,4-dioctylthiomethyl-6-tert-butylphenol, 2,4-dioctylthiomethyl-6-methylphenol, 2,4-dioctylthiomethyl-6-ethylphenol and 2,6-di-dodecylthiomethyl-4-nonylphenol.

Group c) of the hydroquinones and alkylated hydroquinones includes, for example, 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisol, 3,5-di-tert-butyl-4-hydroxyanisol, 3,5-di-tert-butyl-4-hydroxyphenyl stearate and bis-(3,5-di-tert-butyl-4-hydroxyphenyl) adipate.

Group d) of the tocopherols includes, for example, α tocopherol, β-tocopherol, γ-tocopherol, δ-tocopherol and mixtures of these compounds, and also tocopherol derivatives, such as tocopheryl acetate, tocopheryl succinate, tocopheryl nicotinate and tocopheryl polyoxyethylene succinate (tocofersolan).

Group e) of the hydroxylated diphenyl thioethers includes, for example, 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis-(3,6-di-sec-amylphenol) and 4,4'-bis-(2,6-dimethyl-4-hydroxyphenyl) disulfide.

Group f) of the alkylidenebisphenols includes, for example, 2,2'-methylenebis(6-tert-butyl-4-methylphenol), 2,2'-methylenebis(6-tert-butyl-4-ethylphenol), 2,2'-methylenebis[4-methyl-6-(α-methylcyclohexyl.)phenol], 2,2'-methylenebis(4-methyl-6-cyclohexylphenol), 2,2'-methylenebis(6-nonyl-4-methylphenol), 2,2'-methylenebis (4,6-di-tert-butylphenol), 2,2-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis-(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis( 5-tert-butyl-4-hydroxy-2-methylphenyl)-3-n-dodecyl-mercaptobutane, ethylene glycol bis[3,3-bis(3'-tert-butyl-4'-hydroxyphenyl)butyrate], bis(3-tert-butyl-4-hydroxy-5-methyl-phenyl)dicyclopentadiene, bis[2-(3'-tert-butyl-2'-hydroxy-5'-methylbenzyl)-6-tert-butyl-4-methylphenyl] terephthalate, 1,1-bis(3,5-dimethyl-2-hydroxyphenyl) butane, 2,2-bis(3,5-di-tert-butyl-4-hydroxyphenyl)propane, 2,2-bis(5-tert-butyl-4-hydroxy-2-methylphenyl)-4-n-dodecyl-mercaptobutane and 1,1,5,5-tetrakis (5-tert-butyl-4-hydroxy-2-methylphenyl)pentane.

Group g) of the O-, N- and S-benzyl compounds include, for example, 3,5,3',5'-tetra-tert-butyl-4,4'-dihydroxydibenzyl ether, octadecyl-4-hydroxy-3,5-dimethylbenzylmercaptoacetate, tridecyl 4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl) dithioterephthalate, bis(3,5-di-tert-butyl-4-hydroxybenzyl) sulfide and isooctyl 3,5-di-tert-butyl-4-hydroxybenzylmercaptoacetate.

Group h) of the aromatic hydroxybenzyl compounds includes, for example, 1,3,5-tris(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene and 2,4,6-tris(3,5-di-tert-butyl-4-hydroxybenzyl)phenol.

Group i) of the triazine compounds includes, for example, 2,4-bis(octylmercapto)-6-(3,5-di-tert-butyl-4-hydroxyanilino)-1,3,5-triazine, 2-octylmercapto-4,6-bis(3, 5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris(3,5-di-tert-butyl-4-hydroxybenzyl) isocyanurate, 1,3,5-tris(4-tert-butyl-3-hydroxy-2,6-dimethylbenzyl) isocyanurate, 2,4,6-tris(3,5-di-tert-butyl-4-hydroxy-phenylethyl)-1,3,5-triazine, 1,3,5-tris-(3,5-di-tert-butyl-4-hydroxyphenylpropionyl)-hexahydro-1,3,5-triazine, 1,3,5-tris(3,5-dicyclohexyl-4-hydroxybenzyl) isocyanurate and 1,3,5-tris(2-hydroxyethyl) isocyanurate.

Group j) of the benzylphosphonates includes, for example, dimethyl 2,5-di-tert-butyl-4-hydroxybenzylphosphonate, diethyl 3,5-di-tert-butyl-4-hydroxybenzylphosphonate, dioctadecyl 3,5-di-tert-butyl-4-hydroxybenzylphosphonate and dioctadecyl 5-tert-butyl-4-hydroxy-3-methylbenzylphosphonate Group k) of the acylaminophenols includes, for example, 4-hydroxylauroylanilide, 4-hydroxystearoylanilide and octyl N-(3,5-di-tert-butyl-4-hydroxyphenyl)carbamate.

The esters of the propionic and acetic acid derivatives in group l) are based on mono- or polyhydric alcohols, such as methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris (hydroxyethyl) isocyanurate, N,N'-bis(hydroxyethyl) oxamide, 3-thiaundecanol, 3-thiapentadecanol, trimethylhexanediol, trimethylolpropane and 4-hydroxymethyl-1-phospha-2,6,7-trioxabicyclo[2.2.2] octane.

The amides of the propionic acid derivative in group m) are based on amine derivatives, such as N,N'-bis(3,5-di-tert-butyl-4-hydroxyphenylpropionyl)hexamethylenediamine, N,N'-bis(3,5-di-tert-butyl-4-hydroxyphenylpropionyl) trimethylenediamine and N,N'-bis(3,5-di-tert-butyl-4-hydroxyphenylpropionyl)hydrazine.

Group n) includes not only ascorbic acid (Vitamin C) but also ascorbic acid derivatives such as ascorbyl palmitate, laurate and stearate, sulfate and phosphate.

Group o) of the antioxidants based on the amine compounds includes, for example, N,N'-diisopropyl-p-phenylenediamine, N,N'-di-sec-butyl-p-phenylenediamine, N,N'-bis(1,4-dimethylpentyl)-p-phenylenediamine, N,N'-bis (1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfamoyl)diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octyl-substituted diphenylamine, such as p,p'-di-tert-octyldiphenylamine, 4-n-butylaminophenol, 4-butyrylaminophenol, 4-nonanoylaminophenol, 4-dodecanoylaminophenol, 4-octadecanoylaminophenol, bis[4-methoxyphenyl)amine, 2,6-di-tert-butyl-4-dimethylaminomethylphenol, 2,4-diaminodiphenylmethane, 4,4'-diaminodiphenylmethane, N,N,N',N'-tetramethyl-4,4'-di-aminodiphenylmethane, 1,2-bis[(2-methylphenyl)amino] ethane, 1,2-bis(phenylamino)propane, (o-tolyl)biguanide, bis[4-(1',3'-dimethylbutyl)phenyl]amine, tert-octyl- substituted N-phenyl-1-naphthylamine, a mixture of mono- and dialkylated tert-butyl/tert-octyldiphenylamine, a mixture of mono- and dialkylated nonyldiphenylamine, a mixture of mono- and dialkylated dodecyldiphenylamine, a mixture of mono- and dialkylated isopropyl/isohexyldiphenylamine, a mixture of mono- and dialkylated tert-butyldiphenylamine, 2,3-dihydro-3,3-dimethyl-4H-1,4-benzothiazine, phenothiazine, a mixture of mono- and dialkylated tert-butyl/tert-octylphenothiazine, a mixture of mono- and dialkylated tert-octylphenothiazine, N-allylphenothiazine, N,N,N',N'-tetraphenyl-1,4-diaminobut-2-ene, N,N-bis(2,2,6,6-tetramethylpiperidin-4-yl)hexamethylenediamine, bis(2, 2,6,6-tetramethylpiperidin-4-yl) sebacate, 2,2,6,6-tetramethylpiperidin-4-one and 2,2,6,6-tetramethylpiperidin-4-ol.

Group p) of the phosphites and phosphonites includes, for example, triphenyl phosphite, diphenyl alkyl phosphite, phenyl dialkyl phosphite, tris(nonylphenyl) phosphite, trilauryl phosphite, trioctadecyl phosphite, distearyl pentaerythritol diphosphite, tris(2,4-di-tert-butylphenyl) phosphite, diisodecyl pentaerythritol diphosphite, bis(2,4-di-tert-butylphenyl) pentaerythritol diphosphite, bis(2,6-di-tert-butyl-4-methylphenyl) pentaerythritol diphosphite, diisodecyloxy pentaerythritol diphosphite, bis(2,4-di-tert-butyl-6-methylphenyl) pentaerythritol diphosphite, bis(2,4, 6-tris-(tert-butylphenyl)) pentaerythritol diphosphite, tristearyl sorbitol triphosphite, tetrakis(2,4-di-tert-butylphenyl)-4,4,-biphenylene diphosphonite, 6-isooctyloxy-2,4,8,10-tetra-tert-butyl-12H-dibenz[d,g]-1, 3,2-dioxaphosphocine, 6-fluoro-2,4,8,10-tetra-tert-butyl-12-methyldibenz [d,g]-1,3,2-dioxa-phosphocine, bis(2,4-di-tert-butyl-6-methylphenyl) methyl phosphite and bis(2,4-di-tert-butyl-6-methylphenyl) ethyl phosphite.

The group q) of the 2-(2'-hydroxyphenyl)benzotriazoles includes, for example, 2-(2'-hydroxy-5'-methylphenyl)-benzotriazole, 2-(3',5'-di-tert-butyl-2'-hydroxyphenyl) benzotriazole, 2-(5'-tert-butyl-2'-hydroxyphenyl) benzotriazole, 2-(2'-hydroxy-5'-(1,1,3,3-tetramethylbutyl) phenyl)benzotriazoler 2-(3',5'-di-tert-butyl-2'-hydroxyphenyl)-5-chloro-benzotriazole, 2-(3'-tert-butyl-2'-hydroxy-5'-methylphenyl)-5-chloro-benzotriazole, 2-(3'-sec-butyl-5'-tert-butyl-2'-hydroxyphenyl)benzotriazole 2-(2'-hydroxy-4'-octyloxyphenyl)-benzotriazole, 2-(3',5'-di-tert-amyl-2'-hydroxyphenyl)benzotriazole, 2-(3',5'-bis-(α,α-dimethylbenzyl)-2'-hydroxyphenyl)benzotriazole, a mixture of 2-(3'-tert-butyl-2'-hydroxy-5'-(2-octyloxycarbonylethyl)phenyl)-5-chlorobenzotriazole, 2-(3'-tert-butyl-5'-[2-(2-ethylhexyloxy)-carbonylethyl]-2'-hydroxyphenyl)-5-chlorobenzotriazole, 2-(3'-tert-butyl-2'-hydroxy-5'-(2-methoxycarbonylethyl)phenyl)-5-chlorobenzotriazole, 2-(3'-tert-butyl-2'-hydroxy-5'-(2-methoxycarbonylethyl)phenyl)-benzotriazole, 2-(3'-tert-butyl-2'-hydroxy-5'-(2-octyloxycarbonylethyl)phenyl) benzotriazole, 2-(3'-tert-butyl-5'-[2-(2-ethylhexyloxy) carbonylethyl]-2'-hydroxy phenyl)benzotriazole, 2-(3'-dodecyl-2'-hydroxy-5'-methylphenyl )benzotriazole and 2-(3'-tert-butyl-2'-hydroxy-5'-(2-isooctyloxycarbonylethyl) phenylbenzotriazole, 2,2'-methylenebis[4-(1,1,3,3-tetramethylbutyl)-6-benzotriazol-2-ylphenol]; the product of the complete esterification of 2-[3'-tert-butyl-5'-(2-methoxycarbonylethyl)-2'-hydroxyphenyl]-2H-benzotriazole with polyethylene glycol 300; [R—CH$_2$CH$_2$—COO(CH$_2$)$_3$—]$_2$, where R=3'-tert-butyl-4'-hydroxy-5'-2H-benzotriazol-2-ylphenyl.

Group r) of the sulfur-containing peroxide scavengers and sulfur-containing antioxidants includes, for example, esters of 3,3'-thiodipropionic acid, such as the lauryl, stearyl, myristyl or tridecyl esters, mercaptobenzimidazole or the zinc salt of 2-mercaptobenzimidazole, zinc dibutyl dithiocarbamate, dioctadecyl disulfide and pentaerythritol tetrakis(β-dodecyl-mercapto) propionate.

Group s) of the 2-hydroxybenzophenones includes, for example, the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

Group t) of the esters of unsubstituted and substituted benzoic acid includes, for example, 4-tert-butylphenyl salicylate, phenyl salicylate, octylphenyl salicylate, dibenzoylresorcinol, bis(4-tert-butylbenzoyl)resorcinol, benzoylresorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate and 2-methyl-4,6-di-tert-butylphenyl 3,5-di-tert-butyl-4-hydroxybenzoate.

Group u) of the acrylates includes, for example, ethyl α-cyano-β,β-diphenylacrylate, isooctyl α-cyano-β,β-diphenylacrylate, methyl α-methoxycarbonylcinnamate, methyl α-cyano-β-methyl-p-methoxycinnamate, butyl α-cyano-β-methyl-p-methoxycinnamate and methyl α-methoxycarbonyl-p-methoxycinnamate.

Group V) of the sterically hindered amines includes, for example, bis(2,2,6,6-tetramethylpiperidin-4-yl) sebacate, bis(2,2,6,6-tetramethylpiperidin-4-yl) succinate, bis(1,2,2,6, 6-pentamethylpiperidin-4-yl) sebacate, bis(1-octyloxy-2,2, 6,6-tetramethylpiperidin-4-yl) sebacate, bis(1,2,2,6,6-pentamethylpiperidin-4-yl) n-butyl-3,5-di-tert-butyl-4-hydroxybenzylmalonate, the condensation product of 1-(2-hydroxyethyl)-2,2,6,6-tetramethyl-4-hydroxypiperidine and succinic acid, the condensation product of N,N'-bis(2,2,6,6-tetramethylpiperidin-4-yl)hexamethylenediamine and 4-tert-octylamino-2,6-dichloro-1,3,5-triazine, tris (2,2,6,6-tetramethylpiperidin-4-yl) nitrilotriacetate, tetrakis(2,2,6,6-tetramethylpiperidin-4-yl) 1,2,3,4-butane-tetracarboxylate, 1,1'-(1,2-ethylene)bis(3,3,5,5-tetramethylpiperazinone), 4-benzoyl-2,2,6,6-tetramethylpiperidine, 4-stearyloxy-2,2, 6,6-tetramethylpiperidine, bis(1,2,2,6,6-pentamethylpiperidin-4-yl) 2-n-butyl-2-(2-hydroxy-3,5-di-tert-butylbenzyl) malonate, 3-n-octyl-7,7,9,9-tetramethyl-1, 3,8-triazaspiro[4.5]decane-2,4-dione, bis(1-octyloxy-2,2,6,6-tetrametbylpiperidin-4-yl) sebacate, bis (1-octyloxy-2,2,6,6-tetramethylpiperidin-4-yl) succinate, the condensation product of N,N'-bis(2,2,6,6-tetramethylpiperidin-4-yl) hexamethylenediamine and 4-morpholino-2,6-dichloro-1,3,5-triazine, the condensation product of 2-chloro-4,6-bis(4-n-butylamino-2,2,6,6-tetramethylpiperidin-4-yl)-1,3,5-triazine and 1,2-bis(3-aminopropylamino)ethane, the condensation product of 2-chloro-4,6-di-(4-n-butylamino-1,2,2,6,6-pentamethylpiperidin-4-yl)-1,3,5-triazine and 1,2-bis(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethylpiperidin-4-yl)pyrrolidine-2,5-dione, 3-dodecyl-1-(1,2,2,6,6-pentamethylpiperidin-4-yl)pyrrolidine-2,5-dione, a mixture of 4-hexadecyloxy- and 4-stearyloxy-2,2,6,6-tetramethylpiperidine, the condensation product of N,N'-bis(2,2,6,6-tetramethylpiperidin-4-yl) hexamethylenediamine and 4-cyclohexylamino-2,6-dichloro-1,3,5-triazine, the condensation product of 1,2-bis (3-aminopropylamino)ethane and 2,4,6-trichloro-1,3,5-triazine, 4-butylamino-2,2,6,6-tetramethylpiperidine, N-(2,2,6,6-tetramethylpiperidin-4-yl )-n-dodecylsuccinimide, N-(1,2,2,6,6-pentamethylpiperidin-4-yl)-n-dodecylsuccinimide, 2-undecyl-7,7,9,9-tetramethyl-1-oxa-3,8-diaza-4-oxo-spiro[4.5]-decane, the condensation product of 7,7,9,9-tetramethyl-2-cycloundecyl-1-oxa-3,8-diaza-4-oxospiro-[4.5]decane and epichlorohydrin, the condensation products of 4-amino-2,2,6,6-tetramethylpiperidine with tetramethylolacetylenediureas and poly(methoxypropyl-3-oxy)(4-(2,2,6,6-tetramethyl) piperidinyl3-siloxane.

Group w) of the oxamides includes, for example, 4,4'-dioctyloxyoxanilide, 2,2'-diethoxyoxanilide, 2,2'-dioctyloxy-5,5'-di-tert-butoxanilide, 2,2'-didodecyloxy-5,5,-di-tert-butoxanilide, 2-ethoxy-2'-ethyloxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide and also mixtures of ortho-, para-methoxy-disubstituted oxanilides and mixtures of ortho- and para-ethoxy-disubstituted oxanilides.

Group x) of the 2-(2-hydroxyphenyl)-1,3,5-triazines includes, for example, 2,4, 6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethyl phenyl)-1,3,5-triazine, 2,4-bis(2-hydroxy-4-propyloxyphenyl)-6-(2,4-dinmethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis (2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxy-propoxy)-phenyl]-4,6-bis(2,4-dimethyl)-1,3,5-triazine, 2-[2-hydroxy-4-(2-hydroxy-3-octyloxy-propoxy)phenyl]-4,6-bis(2,4-dimethyl)-1,3,5-triazine, 2-(4-(dodecyloxy/tridecyloxy-2-hydroxypropoxy)-2-hydroxy-phenyl3,4,6-bis(2,4-dimethylphenyl)-1,3,5-triazine, 2-[2-hydroxy-4-(2-hydroxy-3-dodecyloxy-propoxy)phenyl]-4,6-bis-(2,4-dimethylphenyl)-1,3,5-triazine, 2-(2-hydroxy-4-hexyloxyphenyl)-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxy-propoxy)phenyl]-1,3,5-triazine and 2-(2-hydroxyphenyl)-4-(4-methoxyphenyl)-6-phenyl-1,3,5-triazine.

The polymer dispersions or polymer solutions of the invention, and the prepared polymers of the invention that are obtainable from them, comprise preferably a polymeric phase obtainable by free-radical polymerization of one or more ethylenically unsaturated monomers. Suitable monomers (initial monomers) that are appropriate for the polymers of the polymer dispersions or polymer solutions and prepared polymers of the invention are in particular those selected from the following groups:

A) $C_2$–$C_8$-alkenes and their halides,
B) $C_4$–$C_8$-alkadienes and their halides,
C) $C_3$–$C_8$-alkenoic acids and $C_1$–$C_{20}$-alkyl $C_3$–$C_8$-alkenoates,
D) vinyl alkyl ethers with $C_1$–$C_{20}$-alkyl radicals,
E) vinyl esters of $C_1$–$C_{20}$ carboxylic acids,
F) $C_8$–$C_{20}$-vinylaromatic compounds,
G) $C_7$–$C_{19}$-vinyl-N-heteroaromatic compounds,
H) $C_3$–$C_8$-alkenenitriles,
I) $C_3$–$C_8$-alkenamides and
J) compounds of the formula

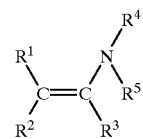

where $R^1$, $R^2$, $R^3$, $R^4$, $R^5$ independently of one another are hydrogen or $C_1$–$C_8$-alkyl in which up to three nonadjacent carbon atoms can be replaced by N, NH or N($C_1$–$C_4$-alkyl) and/or up to three nonadjacent $CH_2$ groups by carbonyl groups, with the proviso that at least one of $R^4$ and $R^5$ is other than hydrogen, or $R^1$, $R^2$, $R^3$ are as defined above and $R^4$ and $R^5$ together form an unsaturated or saturated $C_3$-, $C_4$-, $C_5$- or $C_6$-alkylene bridge in which up to two nonadjacent carbon atoms can be replaced by N, NH or N($C_1$–$C_4$-alkyl) and/or up to two nonadjacent $CH_2$ groups by carbonyl groups.

Group A of the $C_2$–$C_8$-alkenes includes not only ethylene and propylene but also, in particular, compounds having a terminal double bond; thus, for example, 1-butene, 1-pentene, 1-hexene, 1-heptene and 1-octene and also the corresponding iso compounds, such as isobutene and isopentene (2-methyl-1-butene) and the other alkyl-branched α-olefins isomeric with 1-pentene, 1-hexene, 1-heptene and 1-octene. Of minor importance here are compounds such as 2-butene, 2-pentene, 2- and 3-hexene, 2- and 3-heptene and 2-, 3- and 4-octene and also those alkenes where alkyl branching is possible and exists. In certain cases, however, these alkenes too may be used as initial monomers.

The halides of the $C_2$–$C_8$-alkenes include, in particular, vinyl chloride and vinylidene chloride.

Examples of the $C_4$–$C_8$-alkadienes of group B are butadiene and isoprene and, of the corresponding halides, especially chloroprene.

Of minor importance here are $C_6$–$C_8$ dienes and $C_5$–$C_8$ dienes derived from butadiene or chloroprene by substitution with corresponding linear or branched alkyl radicals. In certain cases, however, such compounds too may be present as initial monomers.

Preferred $C_3$–$C_8$-alkenoic acids of group C are acrylic acid, methacrylic acid and crotonic acid (2-butenoic acid), preferred $C_3$–$C_8$-alkenenitriles of group H are acrylo-, methacrylo- and crotononitrile, and preferred $C_3$–$C_8$-alkenamides of group I are the compounds acrylamide, methacrylamide and crotonamide, unsubstituted on the nitrogen atom of the amide group.

In certain cases, however, the initial monomers used may also include the corresponding derivatives of acrylic, methacrylic and crotonic acid, acrylo-, methacrylo- and crotononitrile and acrylamide, methacrylamide and crotonamide that are substituted by linear or branched alkyl chains.

Examples of $C_1$–$C_{20}$-alkyl radicals of the vinyl alkyl ethers of group D and of the alkyl $C_3$–$C_8$-alkenoates of group C are methyl, ethyl, propyl, i-propyl, n-butyl, sec-butyl, i-butyl, t-butyl, n-pentyl (amyl), isoamyl (3-methylbutyl), octyl, 2-ethylhexyl, lauryl, palmityl, stearyl and eicosyl.

Examples of $C_1$–$C_{20}$ carboxylic acids of the vinyl esters of group E are acetic acid, propionic acid, butyric acid, lauric acid, palmitic acid, stearic acid (including its technical-grade form as a mixture with palmitic acid) and also various Versatic® acids, such as Versatic 5 (2,2-dimethylpropionic acid), Versatic 6 (2,2-dimethylbutyric acid) and also Versatic 7, Versatic 8, Versatic 9 and Versatic 10, i.e. 2-ethyl-2-methylbutyric, -pentanoic, -hexanoic, -heptanoic and -octanoic acid, and also mixtures thereof.

Among the $C_8$–$C_{20}$-vinylaromatic compounds of group F as initial monomers are primarily styrene and its derivatives monosubstituted on the benzene ring in o-, m- or p-position relative to the vinyl group by methyl, ethyl, n-propyl, i-propyl, n-butyl, sec-butyl, i-butyl or t-butyl. Examples that may be mentioned here are o-, m- and p-vinyltoluene. These latter compounds, like the other ring-substituted styrene derivatives, can also be used in the form of mixtures as initial monomers. Such mixtures often result as products in the industrial production of these vinylaromatic compounds and are commonly employed as such for further processing into polymers.

Further suitable $C_8$–$C_{20}$-vinylaromatic compounds are the isomers of divinylbenzene, and mixtures thereof. Mention may also be made here of the compounds substituted on the vinyl group of the styrene or substituted styrene by alkyl groups, such as methyl or ethyl, examples being α-methyl- or α-ethylstyrene and also α-methyl- or α-ethylvinyltoluene or mixtures of these compounds with one another.

The $C_7$–$C_{19}$-vinyl-N-heteroaromatic compounds of group G include in particular the vinyl derivatives of pyridine and isomers thereof and also the compounds which may additionally be substituted on the pyridine ring by alkyl, such as methyl or ethyl, and isomers of these compounds. Mention may be made here by way of example of 2-, 3- and 4-vinylpyridine and of α-methyl-5-vinylpyridine. In certain cases it is also possible for vinyl-N-heteroaromatic compounds with higher degrees of condensation, such as N-vinylcarbazole, to be used as initial monomers.

Further suitable initial monomers are compounds of group J as per the above formula. In this formula, $R^1$ and $R^5$ can independently of one another be hydrogen or simple $C_1$–$C_8$-alkyl groups, such as methyl, ethyl, n-propyl, i-propyl or n-butyl, sec-butyl, i-butyl, n-pentyl, isoamyl, 2-ethylhexyl or octyl, or up to three non-adjacent carbon atoms in these $C_1$–$C_8$-alkyl groups can be replaced by N, NH or N-($C_1$–$C_4$-alkyl) and/or up to three nonadjacent $CH_2$ groups can be replaced by carbonyl groups. Possible $C_1$–$C_4$-alkyls for the N-($C_1$–$C_4$-alkyl) group have already been set out above among the $C_1$–$C_8$-alkyl radicals.

Also, of course, the replacement of up to three carbon atoms by N, NH or N-($C_1$–$C_4$-alkyl) and of up to three $CH_2$ groups by carbonyl groups may be effected in a single radical of the radicals $R^1$ to $R^5$, so that, for example, even two adjacent $CH_2$ groups can be replaced by a group —NE—CO— or —N($C_1$–$C_4$-alkyl)—CO—. Since the enamine unsubstituted on the nitrogen atom, in the case of which the radicals $R^4$ and $R^5$ would both be hydrogen, is unstable, the compounds of group J of the above formula I are subject, moreover, to the proviso that at least one of these two radicals $R^4$ and $R^5$ is other than hydrogen.

The examples of possible radicals $R^1$ to $R^5$ in which up to three nonadjacent carbon atoms may have been replaced by N, NH or N-($C_1$–$C_4$-alkyl) and/or up to three nonadjacent $CH_2$ groups by carbonyl groups include, therefore, H—[NR'—$CH_2$)$_2$—]$_m$—NR'—CO— or else

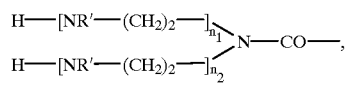

where R' is hydrogen or $C_1$–$C_4$-alkyl and m can be 0, 1 or 2 and $n_1$ and $n_2$ independently of one another can be 0 or 1. Also suitable are radicals H—[NR'—($CH_2$)$_2$—]$_p$—, where R' is again hydrogen or $C_1$–$C_4$-alkyl and p can be 0, 1, 2 or 3.

Further suitable initial monomers of group J are compounds of the above formula in which the radicals $R^1$ to $R^3$ are as defined already and $R^4$ and $R^5$ together form an unsaturated or saturated $C_3$-, $C_4$-, $C_5$- or $C_6$-alkylene bridge in which up to two nonadjacent carbon atoms can have been replaced by N, NH or N-($C_1$–$C_4$-alkyl) and/or up to two nonadjacent $CH_2$ groups by carbonyl groups. As a result the radicals $R^4$ and $R^5$, with the corresponding alkylene bridges, form saturated or unsaturated, isocyclic or N-heterocyclic, four-, five- six- or seven-membered ring systems. Examples of this, including the nitrogen atom which carries the radicals $R^4$ and $R^5$, include

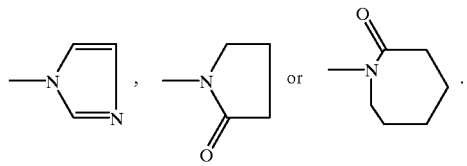

Preferred initial monomers are compounds of the earlier formula in which at least two of the radicals $R^1$ to $R^3$ and, with particular preference, all of the radicals $R^1$ to $R^3$ are hydrogen. Possible examples of the latter are N-vinylformamide, where, inter alia, one of the radicals $R^4$ and $R^5$ is hydrogen and the other is methyl in which a (or the) $CH_2$ group has been replaced by a carbonyl group, N-vinyl-2-pyrrolidone, and N-vinyl-ε-caprolactam.

The polymeric phase or phases of the polymer dispersions or polymer solutions of the invention or of the prepared polymers obtainable from them preferably comprise monomers combined from the groups B/C/F/E, C/F/H, B/C/F, C/F, A/E, E/J, C/E, C/J and C/I. In the case of the combination B/C/F/H these are copolymers of butadiene, (meth)acrylic acid or (meth)acrylates, styrene and acrylonitrile; in the case of the combination C/F/H, copolymers of (meth)acrylic acid or (meth)acrylatest styrene and acrylonitrile; in the case of the combination B/C/F, copolymers of butadiene, (meth)acrylic acid or (meth)acrylates and styrene; in the case of the combination C/F, copolymers of (meth)acrylic acid or (meth)acrylates and styrene; in the case of the combination A/E, copolymers of ethylene with vinyl esters; in the case of the combination E/J, copolymers of vinyl esters with N-vinyl-2-pyrrolidone; in the case of the combination C/E, copolymers of (meth)acrylates and/or crotonic acid or crotonates with vinyl esters; in the case of the combination C/J, copolymers of (meth)acrylic acid or (meth)acrylates with N-vinyl-α-pyrrolidone; and, in the case of the combination C/I, copolymers of (meth)acrylic acid or (meth)acrylates with acrylamide (the term "(meth)acrylic acid" or "(meth) acrylates" here denotes methacrylic acid or acrylic acid, or methacrylates or acrylates, respectively).

In addition, the specified combinations and also other combinations may include different monomers belonging to one group. Thus styrene—as shown in the case of the (meth)acrylic acid and its esters—can be replaced in whole or in part by, for example, α-methylstyrene, vinyltoluene or divinylbenzene or by 2- and/or 4-vinylpyridine and/or 2-methyl-5-vinylpyridine. Replacing some or all of the styrene by such compounds of group G produces copolymers which can be classified as further preferred monomer combinations B/C/F/G/B, C/F/G/H, B/C/F/G and C/F/G and, respectively, B/C/G/H, C/G/H, B/C/G and C/G.

In the case of the combination of monomer groups A/B it is possible, accordingly, for not only ethylene but also, for example, fractions of other alkenes or else alkene halides, such as propylene or vinyl chloride, or mixtures of different vinyl esters to be present.

Further preferred polymeric phases contain only monomers of group C. These include, in particular, the polymers of acrylic acid and of methacrylic acid and their respective esters. Here again it is possible for mixtures of the respective monomeric acids, of the respective monomeric esters or else mixtures of such acids in a mixture with a mixture of such esters to be present. Further suitable polymeric phases are those based on vinyl chloride.

Polymer dispersions, polymer solutions or prepared polymers having polymeric phases which derive predominantly or even exclusively from nonhalogenated $C_2$–$C_8$-alkenes and/or non-halogenated $C_4$–$C_8$-alkenes—examples of such polymers would be homopolymeric ethylene or propylene, copolymeric ethylene/propylene or polybutadiene—are, by contrast, of minor importance within the scope of the present invention.

As regards the chemical identity of the compounds which, in the combinations of initial monomers set out above, have been subsumed under the classes of the (meth)acrylates and, respectively, vinyl esters explicit reference may be made to the above remarks regarding the initial monomers of group C (in conjunction with the remarks in group D relating to possible $C_1$–$C_{20}$-alkyl radicals) and, respectively, of group E.

Also claimed is a process for preparing the polymer dispersions or polymer solutions of the invention which comprises adding one or more stabilizers suitable for protecting organic material against the damaging effect of light, heat and/or oxidation to polymer solutions or polymer dispersions which do not contain such stabilizers (initial polymer dispersions or initial polymer solutions):

The stabilizer or stabilizers is or are preferably added at a temperature of the initial polymer dispersion or solution of from 15 to 95° C. In this case it is advantageous if the stabilizers are in liquid form at the temperature of the dispersion or solution.

If this is not the case, they can also be added as a solution in an appropriate solvent. An appropriate solvent is one which is miscible—at least to a limited extent—with the dispersion medium or solvent; in the preferred embodiment, the solvent is essentially water. Another possible procedure is to employ a solubilizing auxiliary which is miscible—at least to a limited extent—with the dispersion medium and in which the stabilizers can in part be dissolved. In general, suitable solvents or solubilizing auxiliaries are lower alkanols, such as methanol, ethanol, propanol, isopropanol, n-butanol, isobutanol and t-butanol.

Corresponding initial polymer dispersions or solutions can be prepared by emulsion or solution polymerization in accordance with conventional techniques, in which case auxiliaries known to the skilled worker, such as surfactants, dispersing auxiliaries, etc., are normally also present. The content of polymeric phase/phases (dry mass) in such initial polymer dispersions or solutions is usually from 30 to 55% by weight, based on the sum of the dry mass of the polymeric phase(s), the dispersion medium or solvent and any auxiliaries present. Suitable dispersion media and solvents include—in addition to water as the preferred medium—organic compounds, such as toluene, methanol, ethanol or isopropanol. Since a preferred embodiment of the polymer dispersion or solution of the invention comprises essentially water as dispersion medium or solvent, it is advantageous to prepare it using a corresponding aqueous initial polymer dispersion or solution. In addition, it is also possible to dissolve or disperse water-soluble or water-dispersible polymers/copolymers in water, with or without the addition of customary auxiliaries.

Copolymers based on N-vinyl-2-pyrrolidone (group J) and vinyl acetate (group E) are normally prepared by a solution polymerization in ethanol or isopropanol. In this case, therefore, corresponding alcoholic polymer solutions can be used as the initial polymer solution.

Furthermore, such copolymers or else homopolymers of N-vinyl-2-pyrrolidone—these copolymers/homopolymers can be obtained commercially as powders under the tradename Kollidon® (BASF Aktiengesellschaft), for example—can be dissolved or dispersed in water in order to give an aqueous rather than an alcoholic initial polymer dispersion or solution.

It is of course also possible to prepare mixtures of polymer dispersions or solutions of the invention: the mixtures can be of dispersions with one another, of solutions with one another or of dispersions with solutions. In this context, any incompatibility S of the dispersions/solutions with one another can be ascertained by means of simple preliminary experiments; an incompatibility of this kind is frequently known to the skilled worker. In addition, said stabilizers can also be added to corresponding mixtures of initial polymer dispersions and/or solutions.

The polymer dispersions or polymer solutions of the invention and also the prepared polymers of the invention normally comprise the stabilizers in a proportion, based on the overall amount of polymer and stabilizers minus dispersion medium or solvent, respectively, of from 0.01 to 50% by weight, preferably from 5 to 30% by weight.

Where polymer dispersions of the invention are worked up into prepared polymers of the invention it is advantageous not to exceed the glass transition temperature TG of the polymers or, where two or more polymeric phases are present, of the polymer having the lowest $T_G$. In that case the prepared polymers thus obtained will have primary particles whose dimensions are similar to those of the primary particles of the initial polymer dispersion. Starting from dispersions which possess primary particle sizes of typically from 20 to 5000 nm results in prepared polymers which may, depending on the way in which they have been worked up, possess relatively large agglomerates. The primary particles of these agglomerates, however, possess dimensions comparable with those of the polymer particles of the (initial) dispersions. In this case it is possible, for example, to count on a markedly more homogeneous distribution of such prepared polymers when incorporated, for example, into plastics.

In view of the provision of low-dusting or even dust-free prepared polymers the formation of such agglomerates is indeed usually desirable.

Where polymer solutions of the invention are the starting point for making prepared polymers of the invention, not much can of course be said accurately about the primary particle sizes. However, here too it is advantageous to carry out workup below the corresponding $T_G$. Where such solutions are freed from the dispersion medium by spray drying, it is generally possible for the skilled worker to estimate the particle sizes from parameters such as, for example, the concentration of dry mass in the solution in conjunction with the droplet size distribution on spraying.

The invention also claims the use of the polymer dispersions or polymer solutions of the invention or of the prepared polymers of the invention for protecting organic material against the damaging effect of light, heat and/or oxidation.

Also claimed is the use of the polymer dispersions or solutions of the invention or of the prepared polymers of the invention for protecting pharmaceutical or cosmetic products against the damaging effect of light, heat and/or oxidation. The dispersions, solutions or prepared polymers of the invention are either added is directly to the cosmetic or pharmaceutical products, as for example in the case of creams, ointments or pastes, or serve, as for example in the case of plain or coated tablets, for the application of a protective outer coating. In the latter case the normal starting point comprises those dispersions, solutions or prepared polymers in which the polymers present possess relatively low glass transition temperatures. This enables an outer coating to be applied gently by the customary techniques. It is preferred to add stabilizers from groups d and u to the dispersions, solutions or prepared polymers of the invention.

In addition, the use is claimed of the polymer dispersions or solutions or prepared polymers of the invention as light stabilizers in cosmetic preparations. Such preparations are customarily present in a creamy consistency (e.g., a sun cream) or milky consistency (e.g., a sun milk) and serve to protect living organic material, such as the skin of humans or else, in special cases, of animals against solar irradiation. Depending on the desired consistency, therefore, it may be advantageous to add polymer dispersions or polymer solutions of the invention in the case, for example, where a milky consistency is desired or to add prepared polymers of the invention in the case, for example where a creamy consistency is desired. It may also be advantageous to use those dispersions, solutions or prepared polymers of the invention that comprise polymers whose glass transition temperatures are chosen such that filming of the polymers occurs on the living skin, for example. This may lead to better adhesion of the light stabilizer or of the cosmetic preparation which comprises such a stabilizer. Novel dispersions, solutions or prepared polymers of this kind, which are to be used as light stabilizers, preferably comprise stabilizers from groups d, i, n, q, s, t, u and x.

Also claimed is the use of the polymer dispersions or solutions or prepared polymers of the invention in or as adhesives. In the latter case (of use as an adhesive) in particular it is of course important to pay attention to the polymers present therein and to their corresponding glass transition temperatures $T_G$. Since the temperature at which such an adhesive is processed depends on the specific application, the selection of polymers of appropriate $T_G$ is also dependent on this application and on the required processing temperature. This selection can normally be made easily by the person skilled in the art. Novel dispersions, solutions or prepared polymers to be used in or as adhesives may comprise stabilizers from all of the groups.

The polymer dispersions or solutions or prepared polymers of the invention are also used in laminants or may themselves be used as laminants. In terms of the selection of appropriate polymers having a suitable profile of properties for this utility, the comments made above in connection with their use in or as adhesives apply analogously. Laminants of this kind are used to join identical or different substrates.

Examples of suitable substrates are polymer films made of polyethylene, oriented polypropylene, polyamide, polyethylene terephthalate, polyacetate, regenerated cellulose, etc., or else paper or metal foils, such as those of aluminum.

The polymer films can be bonded to one another (film lamination) or transparent polymer films can be bonded to paper (high-gloss film lamination) and also polymer films and/or paper can be bonded to metal foils, such as aluminum foils.

The dispersions, solutions or prepared polymers of the invention can also be used to produce laminated glass. In this case they are likewise used either in or as the corresponding polymeric interlayers which ensure the cohesion of the individual laminae in the laminated glass. Such dispersions, solutions or prepared polymers of the invention for use in or as laminants may comprise stabilizers from all of the groups.

Also claimed is the use of the polymer dispersions or solutions or prepared polymers of the invention in or as adhesion promoters. The term adhesion promoters is also intended to comprehend, in the wider sense, coupling agents, which are used, for example, to improve the adhesive strength of coating materials in civil engineering. Thus the dispersions, solutions or prepared polymers of the invention can be used in or as—and in that case preferably as a dispersion or solution—primers for exterior coatings, since in this case long-term resistance to the effect of light, heat and/or oxidation is particularly important in order to ensure adhesion of the coating material to the respective substrate.

If the formation of a film of the dispersions, solutions ore prepared polymers of the invention with the other components of the adhesion promoter (in the case of use in such promoters) is desired or where such dispersions, solutions or prepared polymers per se are to be used as adhesion promoters, then, as already discussed above, the selection of the polymers present therein must be undertaken with regard to their $T_g$s being suitable for the application.

Such dispersions, solutions or prepared polymers of the invention, intended for use in or as adhesion promoters, can comprise stabilizers from all of the groups.

Also claimed is the use of the polymer dispersions or polymer solutions or prepared polymers of the invention for protecting polymer dispersions, paints or varnishes against the damaging effect of light, heat and/or oxidation. Depending on the composition of the paints or varnishes, either dispersions/solutions or prepared polymers may be appropriate here. The latter are used preferably in conventional, solvent-based systems, the former preferably in waterborne systems, although here prepared polymers can of course also be added. In the case of polymer dispersions to be stabilized, the dispersions, solutions or prepared polymers of the invention that are added will normally be those comprising polymers of the same or at least chemically similar composition. In this way it is generally possible to avoid any incompatibility (e.g., coagulation or polymer dispersion) which might otherwise occur. Reference may also be made here, as already indicated several times above, to the role of the glass transition temperature in the selection of appropriate polymers which are present in the dispersions, solutions or prepared polymers of the invention. In accordance with the use of the polymer dispersions, paints or varnishes and depending on the relevant temperatures associated therewith, the person skilled in the art will generally be able without great effort to select suitable dispersions, solutions or prepared polymers of the invention. Such dispersions, solutions or prepared polymers of the invention, intended for use to protect polymer dispersions, paints or varnishes against the damaging effect of light, heat and/or oxidation, may comprise stabilizers from all of the groups.

Also claimed is the use of the polymer dispersions or polymer solutions or prepared polymers of the invention in or as coating compositions for substrates for protecting such substrates against the damaging effect of light, heat and/or oxidation. Examples of substrates suitable in this context are paper, plastic (films), leather, metal (foils), wood, etc. The coating composition which comprises or consists of the dispersions, solutions or prepared polymers of the invention can be used in this context for the final coating or can be applied to the substrate as a "tie coat". In the latter case, the coating composition may additionally have the function of an adhesion promoter and/or laminant. Such dispersions, solutions or prepared polymers of the invention, intended for use as or in coating compositions for substrates, can comprise stabilizers from all of the groups.

Also claimed is the use of the polymer dispersions or polymer solutions or prepared polymers of the invention for protecting plastics against the damaging effect of light, heat and/or oxidation. Since plastics are generally available as granules, it is preferred to add prepared polymers of the invention (before processing) to the plastic. In certain cases, however, dispersions or solutions of the invention may also be used. In this case, however, it is judicious to precede further processing—extrusion, for example—by preliminary drying in, for example, a heated vessel equipped with a stirrer device, since otherwise there may be unwanted formation of bubbles as a result of evaporating dispersion medium or solvent- In addition, the use of dispersions or solutions of the invention may be of advantage if the plastic to be processed is in finely divided form, as a powder, for example. In this case the dispersion medium or solvent present may result in a low-dusting or dust-free mixture which can be processed further with or without preliminary drying.

For incorporating the prepared polymers of the invention into the desired plastic by means of apparatus customary for this purpose, such as extruders, for example, it is possible to follow a procedure whereby this incorporation takes place initially at temperatures below and then at temperatures above the $T_G$ of the prepared polymer used in each case or, in the case of prepared polymers which comprise two or more polymeric phases, initially below the lowest $T_G$ and then above the highest $T_G$. By means of this procedure, the primary particles/agglomerates of the prepared polymer are initially dispersed uniformly in the plastic and subsequently the softened/melted primary particles/agglomerates are mixed on the microscopic scale with the plastic. Novel dispersions, solutions or prepared polymers of this kind intended for use to protect plastics against the damaging effect of heat, light and/or oxidation can comprise stabilizers from all of the groups.

Also claimed in accordance with the invention are polymer films obtainable by filming polymer dispersions or polymer solutions or prepared polymers of the invention. The preparation of films from customary dispersions, solutions or polymer powders is known to the person skilled in the art and can be transferred analogously to the preparation of films from the dispersions, solutions or prepared polymers of the invention. It is merely noted that the temperatures for film formation must be selected with regard to the glass transition temperatures of the polymers present in the dispersions, solutions or prepared polymers of the invention. Analogous references have already been made to this a number of times above.

The polymer films of the invention can be employed as films per se—for example, for agricultural applications (covering films for plants, glass house films, etc.)—or else as top coats for substrates or as laminae within a laminate. When used in this way these polymer films may serve to protect substrates, such as wood, paper, cardboard, leather, metal (foils) or plastic (films) both as top coats and as interlayers within a laminate which is applied to such substrates. The joining of the polymer films of the invention to the substrates or to the adjacent laminae within a laminate is accomplished by customary methods of hot melting, laminating, adhesive bonding, etc. In this instance, dispersions, solutions or prepared polymers of the invention may be used in turn as or in adhesives and/or as or in laminants. Depending on the intended application, appropriate stabilizers will be selected from the respective groups. Where such polymer films of the invention are exposed to light and air, combinations of light stabilizers and antioxidants are appropriate. Where such films merely serve as barrier layers against the unwanted diffusion of atmospheric oxygen—for example, within a composite material for the packaging of foods—the presence of an antioxidant or of a combination of such stabilizers is generally sufficient.

Also claimed in accordance with the invention are coated articles obtainable using polymer dispersions or solutions, prepared polymers or polymer films of the invention.

Where the polymer dispersions or polymer solutions or prepared polymers of the invention are used in rather than as adhesives, laminants, adhesion promoters or coating compositions, they are usually present in amounts of from 0.01 to 10% by weight, preferably from 0.02 to 4% by weight. These percentages by weight relate, in the case of dispersions or solutions, to their corresponding dry masses and, in the case of prepared polymers, to their masses themselves, in proportion to the sum of these dry masses and the dry mass of the adhesives, laminants, adhesion promoters or coating compositions.

The addition of the dispersions, solutions or prepared polymers of the invention to organic material, pharmaceutical or cosmetic products, as light stabilizers to cosmetic preparations, to polymer dispersions, paints or varnishes and to plastics takes place likewise within the abovementioned concentrations—that is, usually in amounts of from 0.01 to 10% by weight and preferably from 0.02 to 4% by weight. These percentages in turn relate to the dry masses.

The dispersions, solutions and prepared polymers can be added to said materials at any desired point in time. Where the materials themselves are to be protected against damaging effects, the dispersions, solutions or prepared polymers of the invention must be tailored thereto in terms of the stabilizers they contain. Where damage to said materials by light, heat and/or oxidation can occur during their preparation or processing, or where there is at least a serious risk of such damage, they can be added even before and/or during the preparation or processing. Where said materials are to be protected as end products or process products against light, heat and/or oxidation, it is generally sufficient to add the dispersions, solutions or prepared polymers of the invention following said preparation or processing.

In addition to the dispersions, solutions or prepared polymers of the invention, further additives, such as metal deactivators, antistatic agents, flame retardants, pigments and fillers, for example, may be added to said materials.

EXAMPLES

Example 1

A solution of 5 g of D,L-α-tocopherol in 20 ml of methanol is run at room temperature into 100 g of a 50% aqueous dispersion of a copolymer of styrene, acrylonitrile and acrylic acid (81.4:14.1:4.5 percent by mass; Styrofan® 120 DE, BASM AG Ludwigshafen, Germany) and the mixture is subsequently stirred at room temperature for 1 h. The sample is dried under reduced pressure at 70° C. and then milled.

This gives 55 g of a free-flowing powder.

Example 2

A solution of 5 g of D,L-α-tocopherol in 20 ml of methanol is run at room temperature into 50 g of a 50% aqueous dispersion of a copolymer of styrene, acrylonitrile and acrylic acid (81.4:14.14.5 percent by mass; Styrofan 120 DE, BASF AG Ludwigshafen, Germany) and the mixture is subsequently stirred at room temperature for 1 h. The sample is dried under reduced pressure at 70° C. and then milled. This gives 30 g of a free-flowing powder.

Example 3

5 g of D,L-α-tocopherol are run at room temperature into 100 g of a 50% aqueous dispersion of a copolymer of styrene, acrylonitrile and acrylic acid (81.4:14.1:4.5 percent by mass; Styrofan 120 DE, BASF AG Ludwigshafen, Germany) and the mixture is subsequently stirred at room temperature for 1 h. The sample is dried under reduced pressure at 70° C. and then milled. This gives 55 g of a free-flowing powder.

Example 4

5 g of D,L-α-tocopherol are run at room temperature into 100 g of a 50% aqueous dispersion of a copolymer of styrene, acrylonitrile and acrylic acid (81.4:14.1:4.5 percent by mass; Styrofan 120 DE, BASF AG Ludwigshafen, Germany) and the mixture is subsequently stirred at room temperature for 1 h. The sample is frozen at −10° C. and dried for 20 h in a freeze drier (model Lyovac GT2 from Leybold/Heraeus) at room temperature.

This gives 55 g of a free-flowing powder.

Example 5

80 g of D,L-α tocopherol are run at room temperature into 800 g of a 50% aqueous dispersion of a copolymer of styrene, acrylonitrile and acrylic acid (81.4:14.1:4.5 percent by mass; Styrofan 120 DE, BASF AG Ludwigshafen, Germany) and the mixture is subsequently stirred at room temperature for 1 h. The sample is spray dried; $N_2$-entry temperature 120° C., $N_2$-exit temperature 70° C.

This gives 420 g of a free-flowing powder.

Example 6

The procedure of Example 5 is repeated but using instead of D,L-α tocopherol a mixture of D,L-α tocopherol and tris(4-nonylphenyl) phosphite. This gives 400 g of a free-flowing powder.

Example 7

A solution of 2.5 g of polymethylpropyl-3-oxy-[4-(2,2,6,6-tetramethyl)piperidinyl]siloxane (Uvasil® 299, Great Lakes) is run at room temperature into 35 g of a 37.5% aqueous dispersion of a copolymer of styrene, acrylonitrile and acrylic acid (81.4:14.1:4.5 percent by mass; Styrofan 120 DE, BASF AG Ludwigshafen, Germany) and the mixture is subsequently stirred at room temperature for 1 h. The sample is dried under reduced pressure at room temperature and then milled. This gives 15 g of free-flowing powder.

Example 8

A solution of 2.5 g of a polymer of dimethyl succinate and 2-[4-hydroxy-2,2,6,6-tetramethyl-1-piperidinyl]ethanol (this polymer is available commercially as Tinuvin® 622 from Ciba Geigy) in 5 ml of methanol is run at room temperature into 25 g of a 50% aqueous dispersion of a copolymer of styrene, acrylonitrile and acrylic acid (81.4:14.1:4.5 percent by mass; Styrofan 120 DE, BASF AG Ludwigshafen, Germany) and the mixture is subsequently stirred at room temperature for 1 h. The sample is dried under reduced pressure at room temperature and then milled. This gives 15 g of a free-flowing powder.

Example 9

2.5 g of bis(1,2,2,6,6-pentamethyl-4-piperidinyl) sebacate (available commercially as Tinuvin® 292 from Ciba Geigy) are run at room temperature into 25 g of a 50% aqueous dispersion of a copolymer of styrene, acrylonitrile and acrylic acid (81.4:14.1:4.5 percent by mass; Styrofan 120 DE, BASF AG Ludwigshafen, Germany) and the mixture is subsequently stirred at room temperature for 1 h. The sample is dried under reduced pressure at room temperature and then milled. This gives 15 g of a free-flowing powder.

Example 10

5 g of D,L-α-tocopherol are run at room temperature into 50 g of a 50% aqueous dispersion of a copolymer of styrene, methyl methacrylate, n-butyl acrylate and acrylic acid (50:29:19:2 percent by mass; Acronal® 3483, BAMF AG Ludwigshafen, Germany) and the mixture is subsequently stirred at room temperature for 1 h. The sample is frozen at −10° C. and dried for 20 h in a freeze drier at room temperature.

This gives 30 g of a free-flowing powder.

Example 11

5 g of D,L-α-tocopherol are run at room temperature into 50 g of a 50% aqueous dispersion of a copolymer of methyl methacrylate, n-butyl acrylate and acrylic acid (60:30:10 percent by mass; Acronal® 969, BASF AG Ludwigshafen, Germany) and the mixture is subsequently stirred at room temperature for 1 h. The sample is frozen at −10° C. and dried for 20 h in a freeze drier at room temperature.

This gives 30 g of a free-flowing powder.

Example 12

A solution of 5 g of ethyl 2-cyano-3,3-diphenylacrylate in 20 ml of methanol is run at room temperature into 50 g of a 50% aqueous dispersion of a copolymer of styrene, acrylonitrile and acrylic acid (81.4:14.1:4.5 percent by mass; Styrofan 120 DE, BASF AG Ludwigshafen, Germany) and the mixture is subsequently stirred at room temperature for 1 h. The sample is dried under reduced pressure at 70° C. and then milled. This gives 30 g of a free-flowing powder.

Example 13

5 g of 2-ethylhexyl 2-cyano-3,3-diphenylacrylate are run at room temperature into 50 g of a 50% aqueous dispersion of a copolymer of styrene, acrylonitrile and acrylic acid (81.4:14.1:4.5 percent by mass; Styrofan 120 DE, BASF AG Ludwigshafen, Germany) and the mixture is subsequently stirred at room temperature for 1 h. The sample is dried under reduced pressure at 70° C. and then milled.

This gives 30 g of a free-flowing powder.

We claim:

1. A polymer dispersion or polymer solution, comprising:
at least one polymeric phase having at least one stabilizer;
wherein said polymeric phase is obtained by free-radical polymerization of at least one ethylenically unsaturated monomer;
wherein said stabilizer is suitable for protecting organic material against the damaging effect of light, heat and/or oxidation; and
wherein said ethylenically unsaturated monomer is selected from the group consisting of
A) $C_2$–$C_8$ alkenes,
B) $C_4$–$C_8$ alkadienes,
C) $C_3$–$C_8$-alkenoic acids and $C_1$–$C_{20}$-alkyl $C_3$–$C_8$-alkenoates,
D) vinyl alkyl ethers with $C_1$–$C_{20}$-alkyl radicals,
E) vinyl esters of $C_1$–$C_{20}$ carboxylic acids,
F) $C_8$–$C_{20}$-vinylaromatic compounds,
G) $C_7$–$C_{19}$-vinyl-N-heteroatomic compounds,
H) $C_3$–$C_8$-alkenenitriles,
I) $C_3$–$C_8$-alkenamides, and
J) compounds of the formula

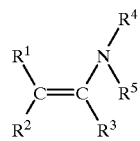

$R^1$, $R^2$, $R^3$, $R^4$, $R^5$ independently of one another are hydrogen of $C_1$–$C_8$-alkyl in which up to three nonadjacent carbon atoms can be replaced by N, NH or N($C_1$–$C_4$-alkyl) and/or up to three nonadjacent $CH_2$ groups by carbonyl groups, with the proviso that at least one of $R^4$ and $R^5$ is other than hydrogen, or
$R^1$, $R^2$ $R^3$ are as defined above and $R^4$ and $R^5$ together form an unsaturated or saturated $C_3$-, $C_4$-, $C_5$- or $C_6$-alkylene bridge in which up to two nonadjacent carbon atoms can be replaced by N, NH or N($C_1$–$C_4$-alkyl) and/or up to two nonadjacent $CH_2$ groups by carbonyl groups; and
wherein an amount of said stabilizer is 9.09 to 50% by weight based on 100% by weight of the polymer and the stabilizer.

2. A polymer dispersion or polymer solution as claimed in claim 1, further comprising water as dispersion medium or solvent.

3. A polymer dispersion or polymer solution as claimed in claim 1, wherein said stabilizer is selected from the groups consisting of:
   a) alkylated monophenols,
   b) alkylthiomethylphenols,
   c) hydroquinones and alkylated hydroquinones,
   d) tocopherols,
   e) hydroxylated diphenyl thioethers,
   i) alkylidenebisphenols,
   g) O-, N- and S-benzyl compounds,
   h) aromatic hydroxybenzyl compounds,
   i) triazine compounds,
   j) benzylphosphonates,
   k) acylaminophenols,
   l) esters of β-(3,5-di-tert-butyl-4-hydroxyphenyl) propionic acid, β-(5-tert-butyl-4-hydroxy-3-methylphenyl)propionic acid, β-(3,5-dicyclohexyl-4-hydroxyphenyl)propionic acid and 3,5-di-tert-butyl-4-hydroxyphenylacetic acid,
   m) amides of β-(3,5-di-tert-butyl-4-hydroxyphenyl) propionic acid,
   n) ascorbic acid and its derivatives,
   o) antioxidants based on amine compounds,
   p) phosphites and phosphonites,
   q) 2-(2'-hydroxyphenyl)benzotriazoles,
   r) sulfur-containing peroxide scavengers and sulfur-containing antioxidants,
   s) 2-hydroxybenzophenones,
   t) esters of unsubstituted and substituted benzoic acid,
   u) acrylates,
   v) sterically hindered amines,
   w) oxamides and
   x) 2-(2-hydroxyphenyl)-1,3,5-triazines.

4. A polymer, comprising:
at least one stabilizer suitable for protecting organic material against the damaging effect of light, heat and/or oxidation;
wherein said polymer is obtained by removing the dispersion medium or solvent from the polymer dispersion or polymer solution of claim 1; and
wherein an amount of said stabilizer is 9.09 to 50% by weight based on 100% by weight of the polymer and the stabilizer.

5. A process for preparing a polymer dispersion or polymer solution as claimed in claim 1, comprising:
adding at least one stabilizer suitable for protecting organic material against the damaging effect of light, heat and/or oxidation to a polymer dispersion or polymer solution which does not contain such stabilizer.

6. A process as claimed in claim 5, wherein the stabilizer is added at a temperature of from 15 to 95° C.

7. An organic material, comprising:
the polymer dispersion or polymer solution as claimed in claim 1 or the polymer as claimed in claim 4.

8. A pharmaceutical or cosmetic product, comprising:
the polymer dispersion or polymer solution as claimed in claim 1 or the polymer as claimed in claim 4.

9. A light stabilizer in cosmetic preparations, comprising:
the polymer dispersion or polymer solution as claimed in claim 1 or the polymer as claimed in claim 4.

10. An adhesive, comprising:
the polymer dispersion or polymer solution as claimed in claim 1 or the polymer as claimed in claim 4.

11. A laminant, comprising:
the polymer dispersion or polymer solution as claimed in claim 1 or the polymer as claimed in claim 4.

12. An adhesion promoter, comprising:
the polymer dispersion or polymer solution as claimed in claim 1 or the polymer as claimed in claim 4.

13. A paint or varnish, comprising:
the polymer dispersion or polymer solution as claimed in claim 1 or the polymer as claimed in claim 4.

14. A coating composition, comprising:

the polymer dispersion or polymer solution as claimed in claim 1 or the polymer as claimed in claim 4.

15. A plastic, comprising:

the polymer dispersion or polymer solution as claimed in claim 1 or the polymer as claimed in claim 4.

16. A method for making a polymer film, comprising:

filming the polymer dispersion or polymer solution as claimed in claim 1.

17. A coated article or polymer film, comprising:

the polymer dispersion or polymer solution as claimed in claim 1 or the polymer as claimed in claim 4.

\* \* \* \* \*